United States Patent [19]

Oakley et al.

[11] Patent Number: 4,607,778

[45] Date of Patent: Aug. 26, 1986

[54] WELDING FIXTURE FOR NUCLEAR FUEL PIN CLADDING ASSEMBLIES

[75] Inventors: David J. Oakley, Richland; Sam H. Feld, West Richland, both of Wash.

[73] Assignee: United States of America as represented by the United States Department of Energy, Washington, D.C.

[21] Appl. No.: 582,419

[22] Filed: Feb. 22, 1984

[51] Int. Cl.⁴ .............................................. B23K 20/08
[52] U.S. Cl. ..................................... 228/2.5; 228/107; 219/8.5; 219/7.5
[58] Field of Search ......................... 228/2.5, 107–109; 219/7.5, 8.5, 9.5; 403/284, 285, 274; 285/21, 334.5, 382

[56] References Cited

FOREIGN PATENT DOCUMENTS 270654 7/1964 Australia .............................. 403/284

Primary Examiner—Kenneth J. Ramsey
Assistant Examiner—Samuel M. Heinrich
Attorney, Agent, or Firm—Edward W. Nypaver; Robert Southworth, III; Judson R. Hightower

[57] ABSTRACT

A welding fixture for locating a driver sleeve about the open end of a nuclear fuel pin cladding. The welding fixture includes a holder provided with an open cavity having shoulders for properly positioning the driver sleeve, the end cap, and a soft, high temperature resistant plastic protective sleeve that surrounds a portion of the end cap stem. Ejected contaminant particles spewed forth by closure of the cladding by pulsed magnetic welding techniques are captured within a contamination trap formed in the holder for ultimate removal and disposal of contaminating particles along with the holder.

7 Claims, 6 Drawing Figures

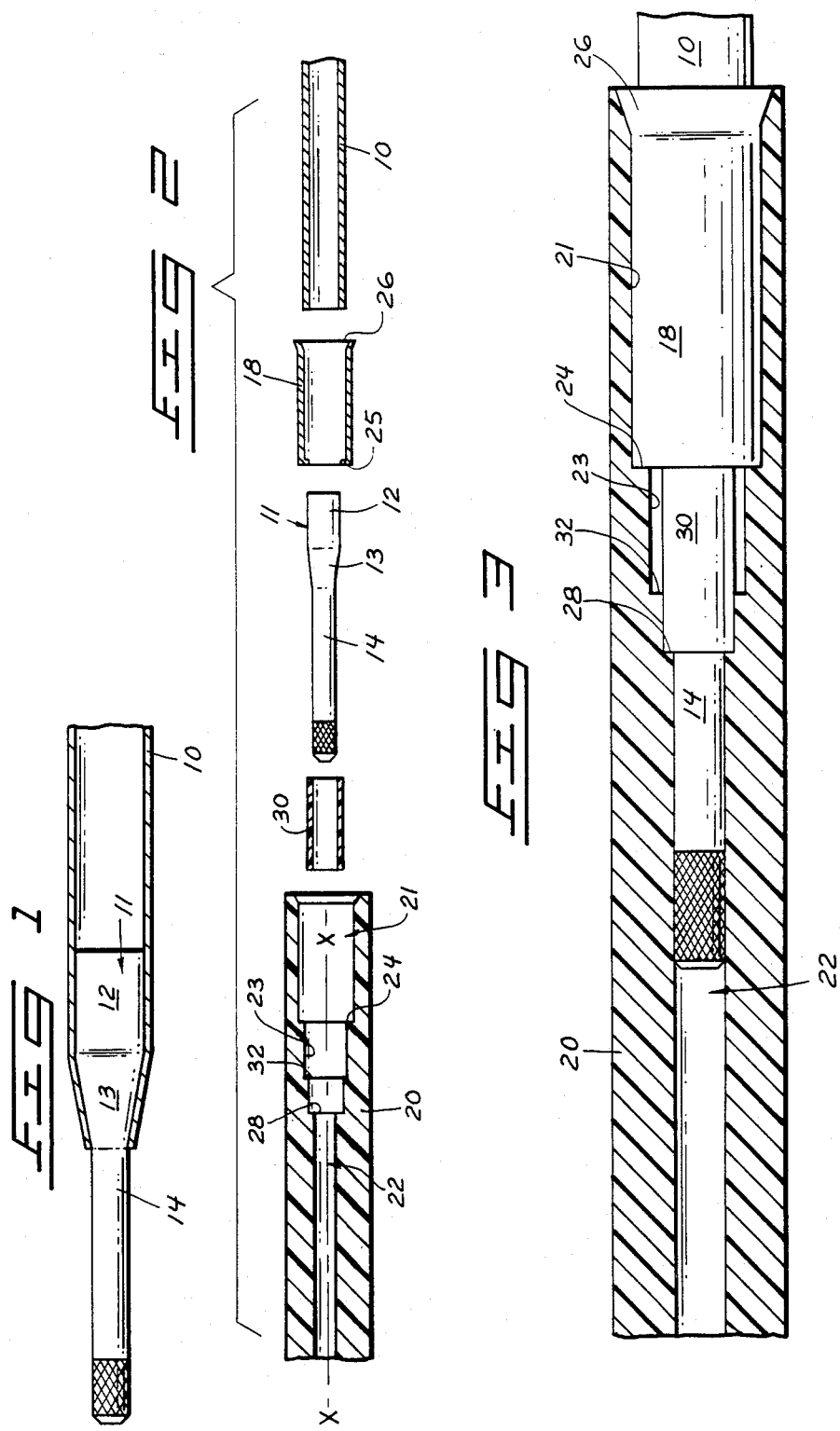

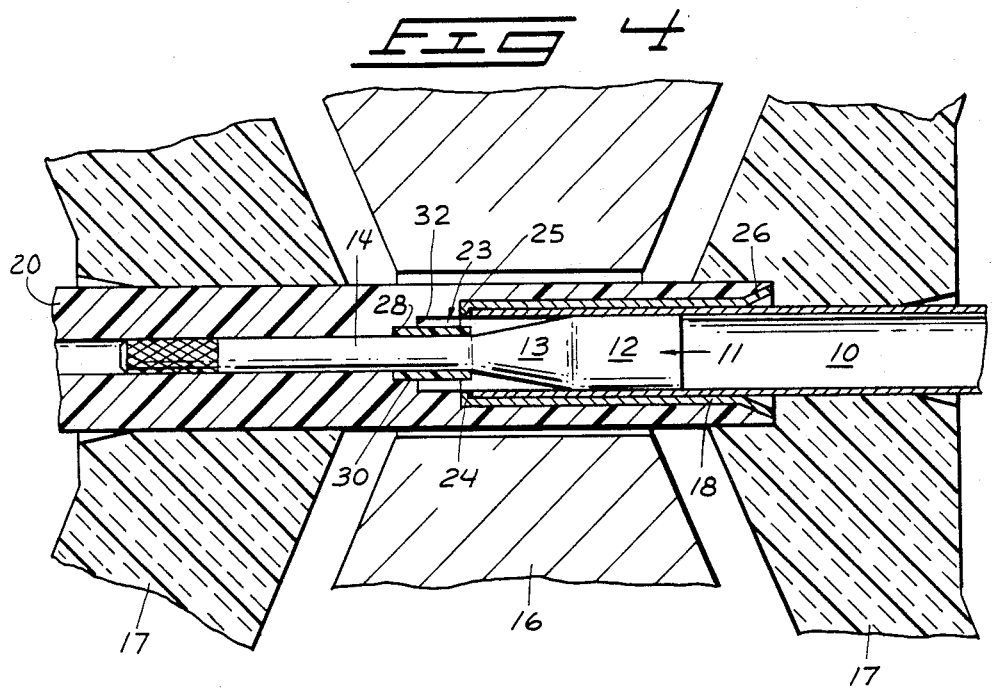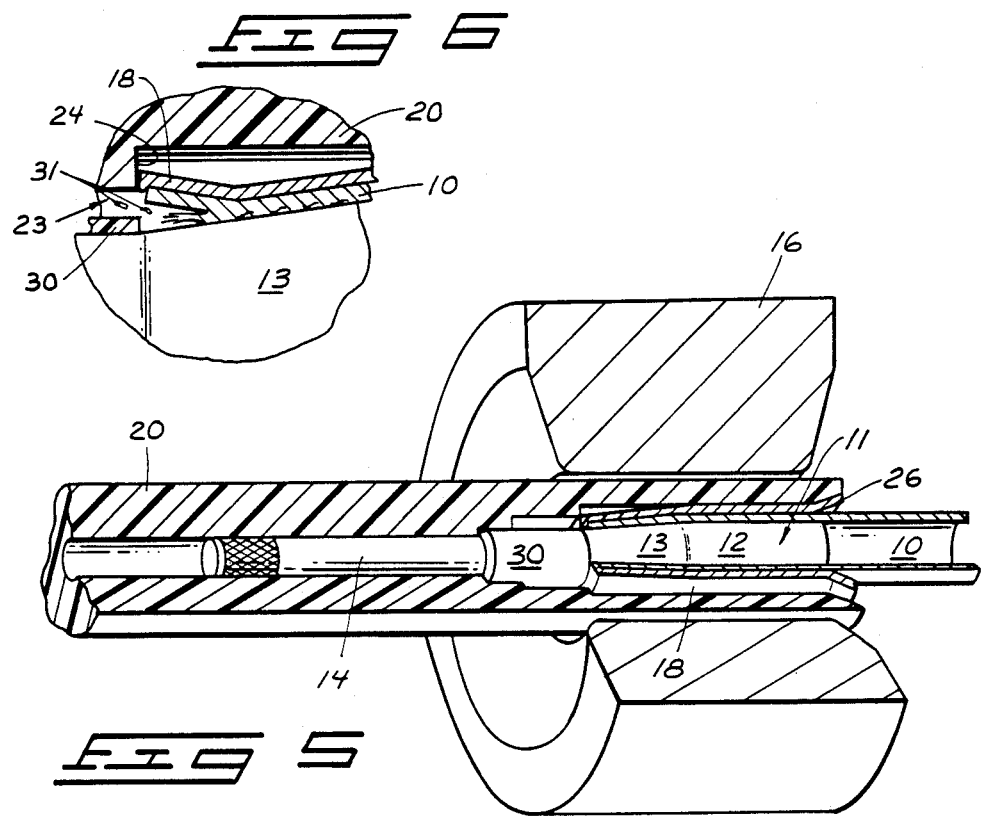

WELDING FIXTURE FOR NUCLEAR FUEL PIN CLADDING ASSEMBLIES

The United States government has rights in this invention pursuant to Contract DE-AC-06-76FF02170 between the U.S. Department of Energy and Westinghouse Electric Corporation.

BACKGROUND OF THE INVENTION

The present invention relates to automated welding of the open end of a nuclear fuel pin cladding assembly. It comprises a welding fixture for coaxially positioning the cladding, an inserted end cap, and a surrounding driver sleeve for closure of the cladding end by pulsed magnetic welding.

This disclosure relates specifically to an improvement in the positioning of a fuel pin end cap for closure of the cladding in a fuel pin by pulsed magnetic welding techniques. In such applications, the cladding is welded about the circumference of an inserted end cap that has a tapered transition zone between a cylindrical section having an exterior diameter substantially equal to the cladding interior diameter, and an outwardly extending stem of reduced diameter. A sleeve of magnetic material is collapsed about the open end of the cladding to weld it about the tapered zone.

The design of the present welding fixture has been directed to two problems encountered during adaptation of pulsed welding techniques to the closure of fuel pin assemblies. First is the requirement that the end cap, driver sleeve and open end of the cladding be accurately arranged in coaxial positions for automated welding purposes. Second, provision must be made to entrap ejected contaminant particles that might be forced from the open end of the length of cladding as it is progressively collapsed along the tapered transition zone.

SUMMARY OF THE INVENTION

It is an object of the present invention to provide a new and useful disposable welding fixture formed of a plastic material and which is simple in construction, inexpensive, and can be accurately molded.

Another object of this invention is to incorporate a contamination trap into the foregoing welding fixture for capturing particles released from the cladding during closure.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the apparatus of this invention may comprise a welding fixture for holding a driver sleeve, an end cap, and the open end of a length of cladding in precise positions relative to one another for closure welding. The welding fixture includes a contamination trap including a protective sleeve for capturing particles ejected from the cladding during closure. The fixture is in the form of a rod-shaped holder including a longitudinal cavity for coaxially locating the protective sleeve, the end cap, the driver sleeve and the cladding.

BRIEF DESCRIPTION OF THE DRAWINGS

The accompanying drawings, which are incorporated into and form a part of the specification, illustrate several embodiments of the present invention, and, together with the description, serve to explain the principles of the invention. In the drawings:

FIG. 1 is a fragmentary, longitudinal sectional view of a length of cladding, showing the attachment of an end cap thereto;

FIG. 2 is a longitudinally exploded view, partially in section, showing the elements of the present welding fixture in conjunction with an end cap;

FIG. 3 is an enlarged fragmentary longitudinal sectional view of the welding fixture, showing the assembled fuel pin elements prior to closure;

FIG. 4 is a fragmentary longitudinal sectional view of the welding fixture, shown located within a welder;

FIG. 5 is a fragmentary, perspective view, partly in section, of the welding fixture showing the closing of the cladding about the end cap during the welding operation; and FIG. 6 is an enlarged fragmentary perspective view, in section, illustrating the escape of containment particles from the open end of the cladding during a magnetic pulse welding operation.

DESCRIPTION OF THE PREFERRED EMBODIMENT

The accompanying drawings describe one form of the welding fixture in detail. It is to be understood that modifications can be made in this structure without deviating from the basic concepts embodied within it. Therefore, the details are to be considered only as examples.

As shown in FIG. 1, the invention relates to a welding technique for closing the open end of a length of nuclear fuel pin cladding. The cladding is generally designated by the numeral 10. The fuel elements and other components typically provided within cladding 10 are not illustrated in the drawings.

The welding system to which this invention relates utilizes a conventional pulsed magnetic welder of a cylindrical nature. Its basic components, shown partially in FIGS. 4 and 5, comprise a toroidal inductor 16 surrounded by insulators 17. To effect a weld by application of a magnetic pulse, a ring or sleeve 18 of magnetic metal is first placed about the cladding 10. The magnetic material of the sleeve 18 is subsequently collapsed as a result of the magnetic pulse.

Cladding 10 is collapsed about an inserted end cap 11. The end cap includes a cylindrical inner end having an exterior diameter substantially equal to the interior diameter of cladding 10. It also includes a projecting outer stem 14 used to position the end cap 11. A tapered transition zone 13 merges the inner end 12 and the outer stem 14.

The taper in the zone 13 is located within the welder in a position radially inward of sleeve 18. The sleeve 18 is subsequently collapsed about the cladding 10 and end cap 11 by a strong momentary magnetic pulse. The progressive acceleration of the cladding as it collapses about the tapered surface on end cap 11 creates a weld at the outer edge of the cladding 10, sealing cladding 10 to the solid metal end cap 11, as shown in FIG. 1.

Use of a pulsed magnetic welder to produce the closure weld at the end of the cladding 10 requires that driver sleeve 18 be accurately positioned relative to both the end cap 11 and the cladding 10. The assembly must also be accurately positioned in the inductor 16 of the welder. The positioning of these elements has been accomplished by hand, using positioning jigs on the welder. However, these positioning techniques are not adaptable to automated or robotic production equipment.

The present invention arose from a requirement that the fuel pins be loaded and welded solely by automatic equipment. To accomplish this, the end cap 11 and driver sleeve 18 are prepositioned within a holder 20 in the form of a rod which can be gripped by a collet (not shown) or other robotic means. It can then be accurately located within a complementary insulator configuration at each side of the inductor 16 of the welder. By moving the holder 20 against stops formed in the insulators 17, proper positioning of the assembled elements in the welder is accurately assured. This is illustrated generally in the assembly view shown in FIG. 4.

Referring now to FIGS. 2 and 3, the holder 20 has a longitudinal center axis X—X along which all of the elements of this disclosure are coaxially aligned. It extends in a straight line through the holder 20 between its opposed rod ends.

The holder 20 has an axial cavity that includes a first longitudinal section 21 extending inward from one rod end and open to a coaxial second longitudinal section 22. The first longitudinal cavity section 21 has an inner diameter that is complementary to the outer diameter of the driver sleeve 18. The second longitudinal cavity section 22 has an inner diameter that is complementary to the diameter of the end cap stem 14. A third longitudinal cavity section 23 is interposed between sections 21 and 22. It is described in detail below.

In order to accurately position the driver sleeve 18 and the open end of cladding 10 within the holder 20, the holder 20 is provided with a first radial shoulder 24 which is formed across the cavity section 21. It axially positions the driver sleeve 18 and abutting cladding 10 relative to an end cap 11 prepositioned within the holder by frictional engagement of its outer stem 14 within the cavity section 22. To facilitate frictional engagement between the stem 14 and the holder 20, the stem 14 may be provided with a knurled section 15.

FIG. 6 schematically illustrates the progressive movement of the outer end of the cladding 10 against the tapered transition zone 13 on end cap 11. Contaminating fuel particles 31 spewed forth as the weld is being completed must be trapped to prevent contamination of surrounding equipment. To accomplish this, a contamination trap is included within the holder 20. It is shown in the form of an axial cavity surrounding a cylindrical sleeve 30 of relatively soft resin and high temperature resistant plastic material. As an example, the sleeve 30 might be made of a resin produced by DuPont Corp. under its trademark "Vespel".

Protective sleeve 30 is also coaxially positioned within the axial cavity formed within the holder 20. It is located by a second radial shoulder 28 formed across the cavity at a location inward from the first shoulder 24. Its axial position is such as to coaxially locate the protective sleeve 30 about the stem 14 of end cap 11. The preferred location of protective sleeve 30 is immediately adjacent to the tapered transition zone 13 on the end cap 11 (see FIGS. 3, 4 and 5). In the preferred embodiment, the inner diameter of the protective sleeve 30 is substantially equal to the outer diameter of the stem 14 on the end cap 11.

The cavity within holder 20 also includes a third longitudinal cavity section 23 positioned between the first and second sections 21 and 22 and surrounding at least a portion of the protective sleeve 30. This cavity section 23 terminates at a third shoulder 32 and provides a receptacle for ejected particles, some of which adhere to the exposed surfaces of the protective sleeve 30.

The three sections 21, 22 and 23 of the axial cavity formed within the holder 20 are defined by the three inner radial shoulders as seen in FIGS. 2 and 3. The first shoulder 24 is positioned in the cavity for longitudinal abutment by driver sleeve 18. As shown, the driver sleeve 18 preferably includes an inwardly rolled burr 25 adapted to abut the open outer end of a length of cladding 10. It also includes an outwardly bent rim 26 that abuts the open outer end of holder 20. Rim 26 serves to guide cladding 10 into the driver sleeve 18 and to strip holder 20 and driver sleeve 18 from within the welder when the cladding 10 is shifted to the left from the assembled position shown in FIG. 5.

The second shoulder 28 in the cavity is used to abut the outer end of the protective sleeve 30. The inner diameter of the cavity outward from the shoulder 28 is approximately equal to the outer diameter of the protective sleeve 30.

The third radial shoulder 32 is positioned axially between shoulders 24 and 32. The diameter of the cavity outward from the shoulder 32 is larger than the outer diameter of the protective sleeve 30. This creates a circumferential void that exposes at least a portion of the protective sleeve 30 to the cavity interior. This void is defined by the previously-described third cavity section 23.

The welding fixture is preferably constructed of plastic resin. It can be molded by injection molding processes. When used, it is first preassembled with the protective sleeve 30, driver sleeve 18 and end cap 11 gripped within its cavity. It is then moved axially in opposition to the cladding 10, against stops provided in the welder insulators 17. The cladding 10 is then moved axially in opposition to the welding fixture, into the driver sleeve 18, and against the inwardly rolled burr 25. This results in the elements of the end assembly being properly located relative to one another along their common axis in proper position within the welder inductor 16.

After closure of the cladding 10 about end cap 11, the holder 20 and driver sleeve 18 will move as a unit with the cladding 11 when the cladding is shifted to the left as viewed in the drawings. They can be subsequently stripped from cladding 10 and end cap 11 by holding them against reverse movement of the cladding 10 to the right. The plastic holder 20 and driver sleeve 18 can then be discarded. The protective sleeve 30 is frictionally held within the third cavity section 23 of the holder 20 and will remain within it. The fuel pin and welded end cap, as shown in FIG. 1, can then be further processed.

Testing of the structure has shown that the contamination trap performs its intended function well. The welded end cap 11 has been found to be contamination free. The weld positioning achieved has been found to be accurate. Repeatable welds have been successfully performed by use of the disclosed welding fixture.

The foregoing description of the preferred embodiment of the invention has been presented for purposes of illustration and description. It is not intended to be exhaustive nor to limit the invention to the precise form disclosed. Obviously, many modifications and variations are possible in view of the above teaching. The embodiment discussed in detail was chosen and described in order to best explain the principles of the invention and its practical application so as to enable others skilled in this art to best utilize the invention. It is contemplated that various embodiments and modifications suited to a particular use will be utilized. It is intended that the scope of the invention be defined by the claims attached to this disclosure.

We claim:

1. A non-metallic welding fixture for holding a driver sleeve, a nuclear fuel pin end cap with stem and the open end of a length of nuclear fuel pin cladding in precise positions relative to one another for closure welding with the driver sleeve coaxially fitted about the end cap and cladding, comprising:
   a rod-shaped holder having a longitudinal cavity extending inwardly from one axial end of the holder;
   means within said cavity of the rod-shaped holder for coaxially locating the end cap, the driver sleeve and the fuel pin cladding in required longitudinal positions relative to one another; and
   contamination trap means within said cavity of the rod-shaped holder adapted to be located about the end cap stem for retaining contaminant particles ejected axially from the cladding during closure about the end cap.

2. The welding fixture of claim 1 wherein the rod-shaped holder is made of plastic resin.

3. The welding fixture of claim 1 wherein the contamination trap includes a sleeve made of soft high temperature resisting plastic resin and adapted to be fitted about the end cap stem.

4. A welding fixture to hold a driver sleeve, a nuclear fuel pin end cap with stem and the open end of a length of nuclear fuel pin cladding in precise positions relative to one another for closure welding with the driver sleeve coaxially fitted about the end cap and cladding, comprising:
   protective sleeve means adapted to be coaxially fitted about the inner end of the end cap stem;
   a rod-shaped holder having a longitudinal cavity extending inward from one axial end of the holder and adapted to receive the protective sleeve means, end cap, driver sleeve and cladding;
   first shoulder means in the cavity for longitudinal abutment by a driver sleeve.
   second shoulder means in the cavity against which the protective sleeve means abuts when inserted, the inner diameter of the cavity outward from said third shoulder being approximately equal to the outer diameter of the protective sleeve means; and
   third shoulder means in the cavity positioned between the first and second shoulders, the inner diameter of the cavity outward from said third shoulder being larger than the outer diameter of the protective sleeve means, thereby creating a circumferential void around said protective sleeve means for retaining contaminant particles ejected axially from the cladding during closure about the end cap.

5. A welding fixture for facilitating closure of the open end of a length of cylindrical nuclear fuel pin cladding by pulsed magnetic welding, in which the cladding is welded about an inserted coaxial end cap by collapse of a surrounding driver sleeve, the end cap having a tapered transition zone merging between an inner end having a diameter complementary to the cladding interior and an outer stem having a reduced diameter, said fixture comprising:
   a rod having a longitudinal center axis extending between opposed rod ends;
   said rod having an axial cavity including a first longitudinal section extending inward from one rod end open to a coaxial second longitudinal section;
   the first longitudinal cavity section having an inner diameter that is complementary to the outer diameter of a driver sleeve;
   the second longitudinal cavity section having an inner diameter that is complementary to the diameter of an end cap stem;
   first shoulder means formed across the first longitudinal section of said cavity for axially positioning a driver sleeve and open end of a length of cladding relative to an end cap having a step positioned within the second longitudinal cavity section;
   a protective sleeve made from a high temperature resistant material capable of imbedding physical particles ejected from the cladding during closure of its open end;
   second shoulder means formed across the cavity at a location inward from said first shoulder means for coaxially locating said protective sleeve about the stem of an end cap fixed within said second longitudinal cavity section;
   the inner diameter of the protective sleeve being substantially equal to the outer diameter of the stem of an end cap on which it is to be located;
   said rod cavity including a third longitudinal cavity section positioned between said first and second sections in open communication with at least a portion of said protective sleeve, the inner diameter of said third section being greater than the outer diameter of said protective sleeve.

6. The welding fixture of claim 5 wherein said second shoulder means is positioned along the center axis of said rod for locating the protective sleeve about the stem of an end cap at a position adjacent to its tapered transition zone.

7. The welding fixture of claim 5 wherein the inner diameter of the protective sleeve is substantially equal to the outer diameter of the stem of an end cap on which it is to be located.

* * * * *